United States Patent
Jokinen et al.

(10) Patent No.: US 6,270,738 B1
(45) Date of Patent: Aug. 7, 2001

(54) PROCESS FOR PREPARING USABLE PRODUCTS FROM AN IMPURE FERRIC SULFATE SOLUTION

(75) Inventors: Simo Jokinen, Oulu (FI); Stefan Jäfverström, Örebro (SE); Timo Kenakkala, Oulu (FI)

(73) Assignee: Kemira Chemicals OY, Helsinki (FI)

( * ) Notice: Subject to any disclaimer, the term of this patent is extended or adjusted under 35 U.S.C. 154(b) by 0 days.

(21) Appl. No.: 09/421,742

(22) Filed: Oct. 20, 1999

(30) Foreign Application Priority Data

Oct. 30, 1998 (FI) .................................................. 982367

(51) Int. Cl.[7] ............................ C01G 49/00; C01G 45/00
(52) U.S. Cl. ........................ 423/147; 423/140; 423/142; 423/50
(58) Field of Search ........................... 423/140, 147, 423/50, 558, 142; 210/722

(56) References Cited

U.S. PATENT DOCUMENTS

| | | | |
|---|---|---|---|
| 2,899,300 | * 8/1959 | Bailey | .................................... 423/147 |
| 3,816,593 | 6/1974 | Johnson et al. . | |
| 4,231,993 | * 11/1980 | Sandberg et al. | .................... 423/140 |
| 4,305,914 | 12/1981 | Pammenter et al. . | |
| 4,707,349 | * 11/1987 | Hjersted | ............................... 423/146 |
| 5,785,862 | 7/1998 | Graham et al. . | |

FOREIGN PATENT DOCUMENTS

| | | |
|---|---|---|
| WO 97 38944 | 10/1997 | (EP) . |
| 102160 | 10/1998 | (FI) . |
| 2 322 365 | 8/1998 | (GB) . |
| 96/20894 | * 7/1996 | (WO) . |
| PCT/FI97/00229 | 4/1997 | (WO) . |

OTHER PUBLICATIONS

Chemical Abstracts, vol. 83, No. 22, Dec. 1, 1975, Kim, Sangwook XP 002130535.

* cited by examiner

*Primary Examiner*—Steven Bos
(74) *Attorney, Agent, or Firm*—Greenberg Traurig LLP

(57) ABSTRACT

The invention relates to a process for preparing a usable product, in particular a water treatment solution which contains ferric iron, from an impure ferric sulfate solution which contains as an impurity at least one other metal, the process comprising a first precipitation step in which a base is added to the said impure ferric sulfate solution in order to raise the pH to approx. 2–5, preferably approx. 3–4, whereupon ferric hydroxide precipitates;

Figure 1:
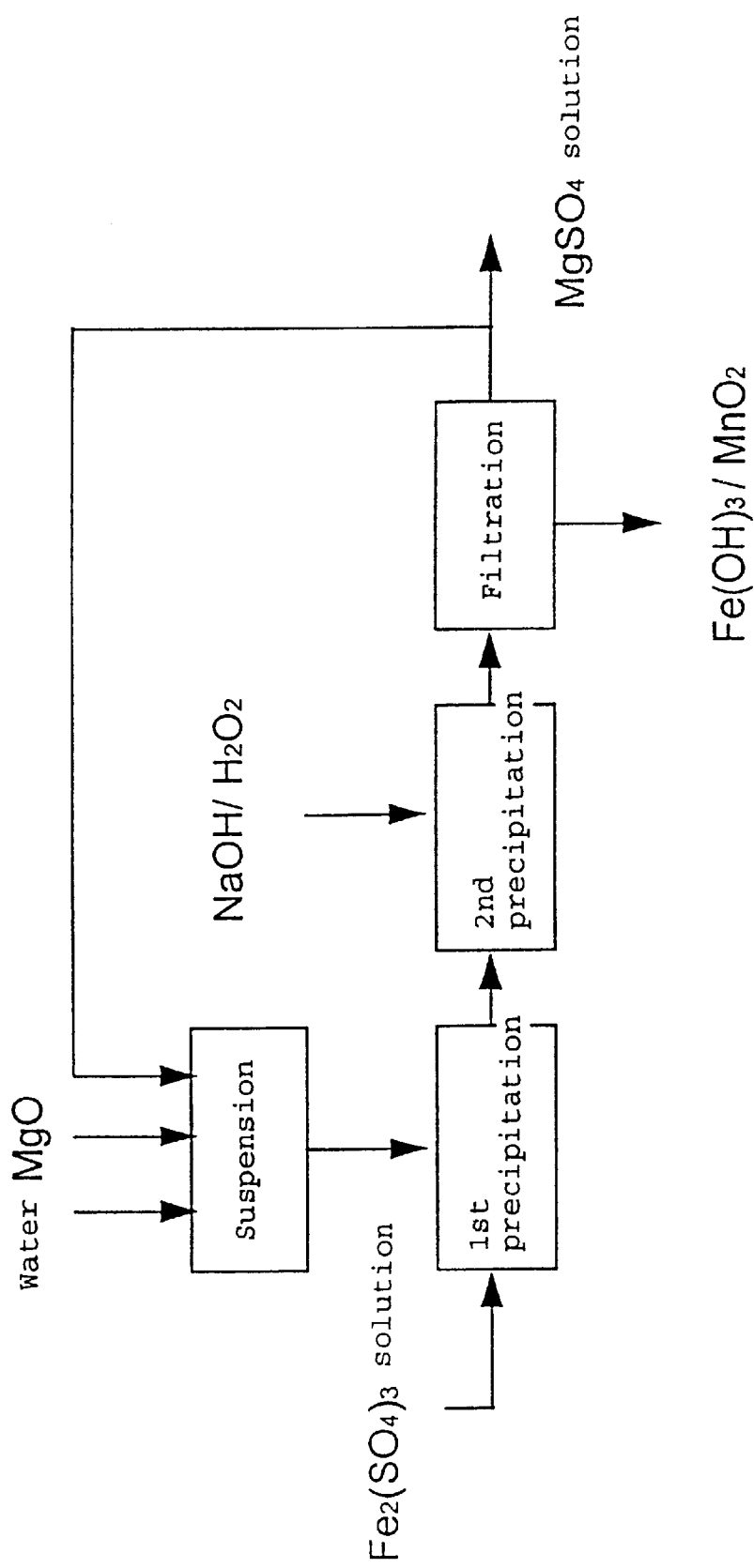

following the first precipitation step, a second precipitation step in which there are added to the solution an oxidant and a base to raise the pH to approx. 6–10, preferably approx. 8–9, whereupon the said impurity metal precipitates; and one or more separation steps to separate from the sulfate solution the solids precipitated in the first and the second precipitation steps; as well as possibly an additional step in which the said separated solids, or a portion thereof, are treated further in order to form a usable product.

19 Claims, 2 Drawing Sheets

PROCESS FOR PREPARING USABLE PRODUCTS FROM AN IMPURE FERRIC SULFATE SOLUTION

FIELD OF THE INVENTION

The invention relates to a process for preparing usable products, in particular a water treatment solution which contains ferric iron, from an impure ferric sulfate solution, in particular a ferric sulfate solution formed in the process for preparing hydronium jarosite.

STATE OF THE ART

The applicant's earlier patent application WO 97/38944 discloses a process for preparing a pure product which contains ferric iron. In this process, the initial substance is hydrous ferrous sulfate produced as a by-products in the process for preparing titanium dioxide. The ferrous sulfate is oxidized with oxygen in a pressurized vessel at an elevated temperature. During the oxidation the ferrous salt dissolves in its own crystal water, and simultaneously hydronium jarosite begins to precipitate. The reaction equation is

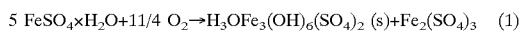
$$5\ FeSO_4 \times H_2O + 11/4\ O_2 \rightarrow H_3OFe_3(OH)_6(SO_4)_2\ (s) + Fe_2(SO_4)_3 \quad (1)$$

During the oxidation step, an equilibrium forms between the ferric sulfate solution and the hydroniumjarosite. At this time approximately one-half of the iron is in the solution and the other half is in the form of precipitated hydroniumn-jarosite. The solid jarosite is filtered out, and it is used for the preparation of pure water treatment chemicals. A solution containing ferric sulfate is left. The use of this solution has proved to be problematic, since it forms in a considerable amount in proportion to the amount of hydroniumjarosite. Its storage is cumbersome and expensive. There is the additional difficulty that the solution contains most of the impurities of the original ferrous sulfate, in particular manganese.

OBJECT OF THE INVENTION

The problem is thus the further treatment of the impure ferric sulfate solution and its potential exploitation. It is therefore an object of the invention to find a method for the exploitation of the impure ferric sulfate solution in such a manner that no materials to be stored and/or eliminated are left from the process for the preparation of hydronium-jarosite. It is thus an object to improve the profitability of the process for the preparation of hydronium jarosite.

INVENTION

According to the invention, there is provided a process for preparing a usable product, in particular a water treatment solution which contains ferric iron, from an impure ferric sulfate solution which contains at least one other metal as an impurity, the process being characterized in that it comprises a first precipitation step, in which a base is added to the said impure ferric sulfate solution in order to raise the pH to approx. 2–5, preferably approx. 3–4, whereupon ferric hydroxide precipitates; following the first precipitation step, a second precipitation step, in which there are added to the solution an oxidant and a base in order to raise the pH to approx. 6–10, preferably approx. 8–9, whereupon the said impurity metal precipitates; and one or more separation steps for separating from the sulfate solution the solids precipitated during the first and the second precipitation steps; and possibly an additional step, in which the said separated solids, or a portion thereof, are treated further in order to form a usable product.

In the process according to the invention there is preferably used as the initial substance an impure ferric sulfate solution which is formed as a by-products of the process for the preparation of hydroniumjarosite and which contains as an impurity manganese, which precipitates as manganese oxide in the second precipitation step.

Thus the process according to the invention comprises two separate precipitation steps, ferric hydroxide being precipitated in the first precipitation step and the impurity metal, such as manganese dioxide, being precipitated in the second precipitation step.

Alongside or in addition to manganese the impurity metal may be, for example, nickel and/or zinc. At the pH concerned, these impurity metals precipitate as hydroxide.

According to one embodiment of the invention, the base added to the first precipitation step is added in the form of a solution or an aqueous suspension, which contains in part or entirely the sulfate solution obtained from the separation step. In this manner the amount of water circulating in the process can be regulated and thereby the concentration of the sulfate solution can be affected.

The base may be MgO, Mg(OH)$_2$, MgCO$_3$, NH$_3$, NaOH, KOH. In this case the said sulfate solution respectively contains soluble MgSO$_4$, (NH$_4$)$_2$SO$_4$, Na$_2$SO$_4$ or K$_2$SO$_4$.

One usable magnesium-containing base is an aqueous suspension prepared from calcined and ground magnesite. Another option is a suspension which contains magnesium hydroxide. As was pointed out, the suspending can be carried out in water or in the sulfate solution obtained as the final product of the process, or in a suitable mixture of these. Thus there is obtained a basic suspension, which is added to the ferric sulfate solution in order to precipitate iron. The pH of the ferric sulfate solution is originally approx. 1, and in the first precipitation step it is raised to the range of approx. 2–5, preferably approx. 3–4, at which iron precipitates in the form of ferric hydroxide. When magnesium oxide is used as the base in the first precipitation step, there thus occurs the reaction

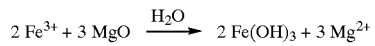
$$2\ Fe^{3+} + 3\ MgO \xrightarrow{H_2O} 2\ Fe(OH)_3 + 3\ Mg^{2+}$$

The precipitated ferric hydroxide is in an amorphous state, in which state its solubility in acids is at its best.

In the second precipitation step, the pH of the solution is raised to approx. 6–10, preferably approx. 8–9, by adding a base, such as NaOH, KOH, Na$_2$CO$_3$ or NH$_3$, to the solution. In addition, an oxidant, such as H$_2$O$_2$, is added to the solution, whereupon the Mn$^{2+}$ oxidizes and precipitates as manganese dioxide. Thus the reaction occurring in the second precipitation step is:

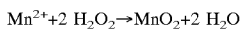
$$Mn^{2+} + 2\ H_2O_2 \rightarrow MnO_2 + 2\ H_2O$$

As the oxidant it is possible to use oxygen oxidants such as hydrogen peroxide, other peroxy compounds, or ozone. In addition it is possible to use chlorine, chlorine dioxide, chlorite, hypochlorite or chlorate.

According to one embodiment of the invention, the process comprises a joint separation step, in which the solids formed in both the first and the second precipitation steps are separated together from the sulfate solution.

According to another embodiment of the invention, the process comprises a first separation step, in which the solids precipitated in the first precipitation step are separated from the sulfate solution, and a second separation step, in which the solids precipitated in the second precipitation step are separated from the sulfate solution.

The solids precipitated in the first and second precipitation steps are preferably separated by filtration, but also other separation methods can be used.

The filtrate is a Mg sulfate solution the Mg content of which ranges from 0.5 to 5%, depending on the composition of the basic suspension of the first step. Such a solution is suitable for use, for example, for the bleaching of cellulose. If the Mg content of the solution is sufficiently high, the magnesium sulfate can be separated from the solution by crystallization. Crystalline magnesium sulfate can be used, for example, as a trace element in fertilizers.

The separated solids contain as the principal component a ferric hydroxide precipitate which can be used for preparing an iron chemical suitable for the treatment of waste water. Since ferric hydroxide is a solid product, it can easily be transported to distant places, where it is dissolved in an acid in order to prepare a solution chemical suitable for waste water applications. Nitric acid is especially suitable. Ferric nitrate solutions are suitable for uses in which the water chemical is required to have oxidizing properties, for example, in the deodorization of waste waters which contain hydrogen sulfide.

In that embodiment of the process according to the invention which contains a joint separation step, the use of nitric acid is advantageous also for the reason that manganese dioxide present in ferric hydroxide does not readily dissolve in nitric acid. Thus most of the manganese dioxide remains undissolved and settles at the bottom of the container. Thus a solution is obtained which has a lower concentration of manganese. Another option is to remove the undissolved portion by filtration.

In addition to nitric acid it is also possible to use hydrochloric acid, sulfuric acid or an organic acid such as formic acid for the dissolving of the ferric hydroxide precipitate. The selection of the acid depends on the purpose for which the iron chemical is needed. For example in treatment use which includes a biologic treatment, ferric hydroxide dissolved in an organic acid would be highly usable, since both the anion and the cation present in the chemical would be exploited in the treatment process.

Figure 2:
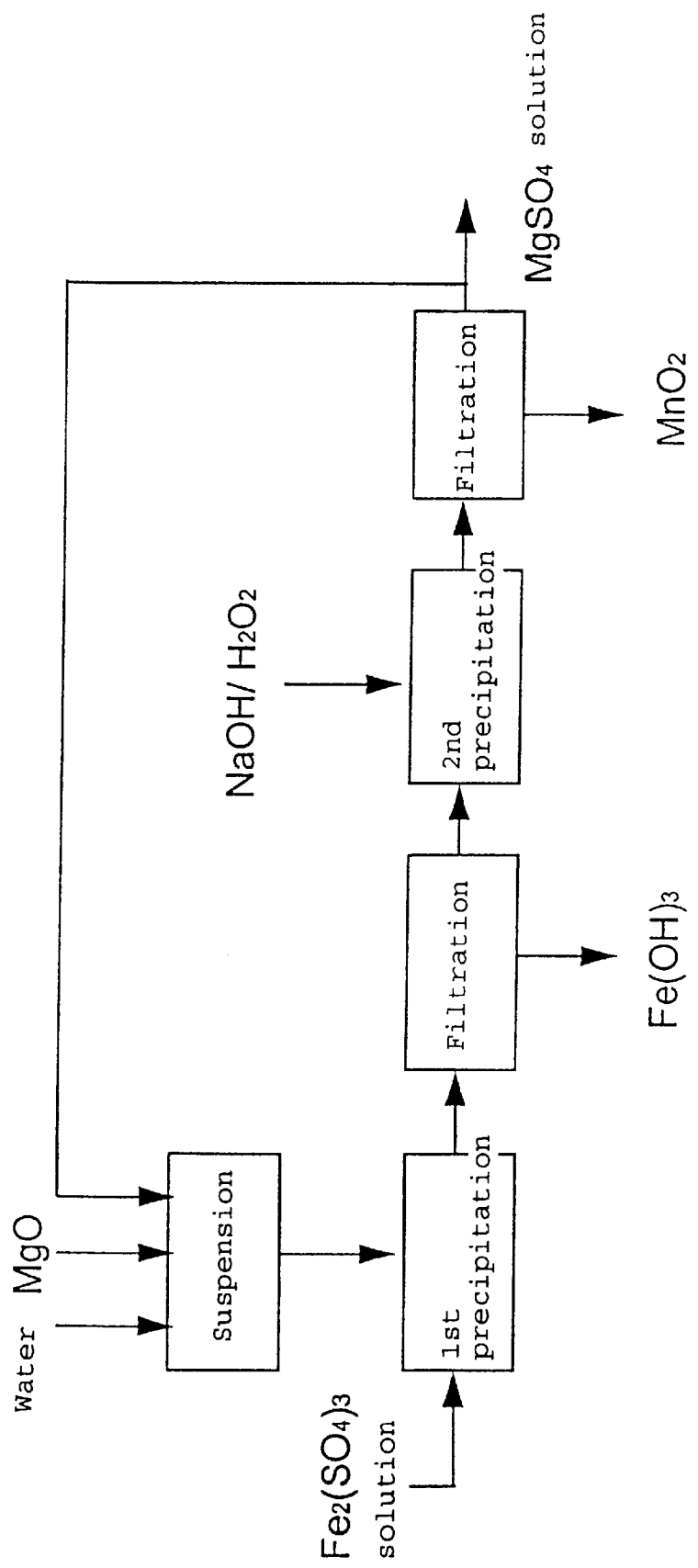

The invention is described below with the help of preparation examples, with reference to the accompanying drawings, in which FIG. 1 depicts a block diagram of an embodiment of the process according to the invention and FIG. 2 depicts a block diagram of another embodiment of the process according to the invention.

FIG. 1 depicts one embodiment of the process according to the invention, having first two successive precipitation steps and thereafter one separation step. The solid material obtained in the separation step contains in the main ferric hydroxide, but also manganese dioxide and possibly other impurities. The solid material is used for the preparation of an iron chemical by dissolving it in a suitable acid. The solution obtained from the separation step is a pure solution containing magnesium sulfate.

FIG. 2 depicts another embodiment of the process according to the invention, having two precipitation steps and two separation steps in such a manner that a separation of solids is carried out after each precipitation step. Ferric hydroxide is separated after the first precipitation step. The ferric hydroxide precipitate thus obtained does not contain impurities and is therefore a highly useful raw material for the preparation of a pure iron chemical. The manganese and other impurities, if any, present in the solution are precipitated in the second precipitation step. They are separated in the second separation step and a waste precipitate is obtained which can be disposed of, for example, by taking it to a dump. What is left is a pure solution containing magnesium sulfate.

EXAMPLE 1

Precipitation of Iron

The experiments were carried out as continuous-working laboratory-scale processes. The initial solution was obtained from the process for the preparation of hydronium jarosite and its analysis was as follows: Fe 4%, $Fe^{2+}$ 0.08% and Mn 490 ppm. For the precipitation of iron, a suspension having a Mg concentration of 2.4% was prepared from a MgO powder and a water solution containing magnesium sulfate. This suspension was added to the solution continuously while maintaining the pH at 3.5, whereupon $Fe(OH)_3$ precipitated. The reaction vessel was an open reactor equipped with a stirrer and a heating mantle. The temperature was maintained at 40° C. and the retention time was 1 h. A specimen taken from the reactor was filtered, and the filtrate was analyzed: Mg 1.9%, Mn 311 ppm, Ni 1.9 ppm, $Fe^{2+}$ <0.01%. The filter cake was dried and analyzed: Fe 47.4%, Mg 1.5%, state amorphous. The concentration of manganese in the precipitate was not analyzed, but a calculation showed that all of the Mn had passed into the filtrate.

The experiments carried out showed that the lower the temperature of the precipitation step, the higher the reactivity of the hydroxide precipitate obtained. The suitable temperature range was 20–40° C. and the most preferable range was 20–30° C.

EXAMPLE 2

Precipitation of Manganese

To the suspension of Example 1, NaOH (25% solution) and $H_2O_2$ (10% solution) were added in order to precipitate the manganese. The base was fed deep under the surface of the solution, whereas the hydrogen peroxide was added directly to the surface. The pH was adjusted to 8–9. The retention time was approx. 1 h and the temperature was 40° C. After the second precipitation step the solids were separated from the suspension by using a laboratory filter, and the filtrate was analyzed: Mg 1.1%, Mn<0.3 ppm, pH 9.15. The filtrate had thus been purified of impurities.

EXAMPLE 3

Dissolving of Iron Precipitate

The following experiment was carried out to dissolve the ferric hydroxide precipitate obtained above. Water (30.3 g), ferric hydroxide precipitate (115.7 g, solids content 66%) and nitric acid (172 g, concentration 65%) were placed in a laboratory vessel. Owing to an exothermal reaction, the temperature rose to 50° C., from which it was raised firther to approx. 80° C. by heating the vessel. After approx. 15 min almost all of the ferric hydroxide had dissolved, and free acid remained in an amount of only 1.1%. The dissolving was, however, continued until the total dissolving time was 2 h. The solution was analyzed: Fe 7.8%, Mg 2.6%, Mn 530 ppm, Ni 13 ppm, N 8% ($NO_3$ 35.4%), free $HNO_3$ 0.4%, undissolved 0.13%. The undissolved material was analyzed semi-quantitatively by X-ray fluorescence: Fe was the principal component, Mg and Mn were present in an amount of approx. 5–10%. This shows that the iron precipitate dissolved well in nitric acid.

What is claimed is:

1. A process for preparing a usable product containing ferric iron from an impure ferric sulfate solution, the process comprising:

providing a first sulfate solution comprising ferric sulfate and at least one metal impurity, the first sulfate solution having an initial pH;

adding a first base to the first sulfate solution in an amount sufficient to raise the initial pH to a second, higher pH of from about 2 to about 5, thereby precipitating ferric hydroxide in a first precipitation step, and forming a ferric hydroxide precipitate and a second sulfate solution;

adding an oxidant and a second base to the second sulfate solution formed in the first precipitation step in an amount sufficient to raise the second pH to a third, higher pH of from about 6 to about 10, thereby precipitating at least one metal impurity in a second precipitating step, and forming a third sulfate solution and a metal impurity precipitate; and separating the precipitated ferric hydroxide from at least one of the second sulfate solution or the third sulfate solution.

2. The process of claim 1, further comprising forming the first sulfate solution as a byproduct formed in a hydronium jarosite preparation process.

3. The process of claim 1, further comprising precipitating manganese dioxide in the second precipitation step.

4. The process of claim 1, further comprising adding at least one of magnesium oxide, magnesium hydroxide, magnesium carbonate, ammonia, sodium hydroxide, and potassium hydroxide as the base in the first precipitation step.

5. The process of claim 1, further comprising adding at least one of sodium hydroxide, potassium hydroxide, sodium carbonate, and ammonia as the base in the second precipitation step.

6. The process of claim 1, further comprising separating the ferric hydroxide precipitate and metal impurity precipitate from the third sulfate solution together in a joint separation step.

7. The process of claim 1, further comprising separating the precipitated ferric hydroxide precipitated in the first precipitation step from the second sulfate solution.

8. The process of claim 1, further comprising separating at least one of the ferric hydroxide precipitate and the metal impurity precipitate from the second or third sulfate solution by filtration.

9. The process of claim 1, further comprising adding at least a portion of the third sulfate solution to a new first sulfate solution, which comprises comprising ferric sulfate and at least one metal impurity, in a first precipitation step for the new sulfate solution.

10. The process of claim 1, further comprising separating the ferric hydroxide precipitate and the metal impurity precipitate from the third sulfate solution in a single step, and adding an acid to the precipitates that dissolves the ferric hydroxide precipitate to form a ferric iron solution, but leaves the metal impurity precipitate undissolved.

11. The process of claim 10, wherein the acid is nitric acid.

12. The process of claim 10, further comprising forming a water treatment solution by separating the ferric iron solution from the undissolved metal impurity precipitate.

13. The process of claim 1, further comprising separating the ferric hydroxide precipitate from the second sulfate solution prior to the second precipitation step.

14. The process of claim 13, further comprising dissolving the separated precipitate in an acid to form a water treatment solution comprising ferric iron.

15. The process of claim 1, further comprising adding the first base in the first precipitation step in an amount sufficient to raise the initial pH to a second, higher pH of from about 3 to about 4.

16. The process of claim 1, further comprising adding the second base in the second precipitation step in an amount sufficient to raise the second pH to a third, higher pH of from about 8 to about 9.

17. The process of claim 1, wherein the oxidant added in the second precipitation step is an oxygen oxidant.

18. The process of claim 1, wherein the oxidant is selected from the group consisting of a peroxy compound, ozone, chlorine dioxide, chlorite, hypochlorite, chlorate, and mixtures thereof.

19. The process of claim 18, wherein the peroxy compound is hydrogen peroxide.

* * * * *